United States Patent [19]
Stewart et al.

[11] Patent Number: 5,557,764
[45] Date of Patent: Sep. 17, 1996

[54] INTERRUPT VECTOR METHOD AND APPARATUS

[75] Inventors: Brett Stewart; Ryan Feemster, both of Austin, Tex.

[73] Assignee: Advanced Micro Devices Inc., Sunnyvale, Calif.

[21] Appl. No.: 433,758

[22] Filed: May 4, 1995

Related U.S. Application Data

[62] Division of Ser. No. 100,152, Aug. 2, 1993, Pat. No. 5,473,763.

[51] Int. Cl.⁶ .................................................. G06F 9/46
[52] U.S. Cl. .................... 395/375; 364/DIG. 1; 364/DIG. 2; 364/ 230; 364/230.2; 364/263.2; 364/941
[58] Field of Search ............. 364/DIG. 1 MS File, 364/DIG. 2 MS File; 395/375, 709, 733, 734, 736, 800

[56] References Cited

U.S. PATENT DOCUMENTS

| | | | |
|---|---|---|---|
| 4,748,617 | 5/1988 | Drewlo | 370/85 |
| 4,761,762 | 8/1988 | Holmes | 364/900 |
| 4,875,161 | 10/1989 | Lahti | 364/200 |
| 4,953,072 | 8/1990 | Williams | 364/200 |
| 4,984,151 | 1/1991 | Dujari | 364/200 |
| 5,027,290 | 6/1991 | Kirk et al. | 364/521 |
| 5,038,282 | 8/1991 | Gilbert et al. | 364/200 |
| 5,067,071 | 11/1991 | Schanin et al. | 395/275 |
| 5,109,513 | 4/1992 | Otsuka | 395/725 |
| 5,121,498 | 6/1992 | Gilbert et al. | 364/700 |
| 5,146,597 | 9/1992 | Williams | 395/725 |
| 5,274,795 | 12/1993 | Vachon | 395/500 |
| 5,283,904 | 2/1994 | Carson et al. | 395/725 |

*Primary Examiner*—Robert B. Harrell
*Attorney, Agent, or Firm*—Foley & Lardner

[57] ABSTRACT

An interrupt vector approach for a processor system loads an interrupt vector directly into an address register to minimize overhead of processing interrupts. A plurality of interrupt triggers correspond to a plurality of interrupt vector registers, each containing a programmable interrupt vector. Upon activation of one of the interrupt triggers, the contents of the corresponding interrupt vector is loaded into a slot memory address counter. The address counter addresses a sequencer slot memory which contains the starting addresses of sequences of instructions stored in an instruction memory. An instruction address counter receives addresses from the sequencer slot memory and provides addresses to the instruction memory. Upon activation of said one of the interrupt triggers, execution of one of the sequences beginning at the address contained in the interrupt register corresponding to the active interrupt trigger is begun, and addresses of the sequences in sequencer slot memory are sequentially loaded into the instruction address counter until a stop bit is indicated in a word in the sequencer slot memory.

3 Claims, 10 Drawing Sheets

| TMR_1 | TMR_0 | EXT_1 | EXT_0 | SSP_A | SSP_B | CPU_A | CPU_B |
|-------|-------|-------|-------|-------|-------|-------|-------|
| D15   | D14   | D13   | D12   | D11   | D10   | D9    | D8    |

| EDGE_T1 | EDGE_T0 | EDGE_E1 | EDGE_E0 | WAIT_E1 | WTMR_E1 | WAIT_E0 | WTMR_E0 |
|---------|---------|---------|---------|---------|---------|---------|---------|
| D7      | D6      | D5      | D4      | D3      | D2      | D1      | D0      |

FIG. 2b

```
TMR_1   =0   TIMER 1      TRIGGER DISABLED.
        =1   TIMER 1      TRIGGER ENABLED.
TMR_0   =0   TIMER 0      TRIGGER DISABLED.
        =1   TIMER 0      TRIGGER ENABLED.
EXT_1   =0   EXTERNAL 1   TRIGGER DISABLED.
        =1   EXTERNAL 1   TRIGGER ENABLED.
EXT_0   =0   EXTERNAL 0   TRIGGER DISABLED.
        =1   EXTERNAL 0   TRIGGER ENABLED.
SSP_A   =0   PEER SSP A   TRIGGER DISABLED.
        =1   PEER SSP A   TRIGGER ENABLED.
SSP_B   =0   PEER SSP B   TRIGGER DISABLED.
        =1   PEER SSP B   TRIGGER ENABLED.
CPU_A   =0   CPU A        TRIGGER DISABLED.
        =1   CPU A        TRIGGER ENABLED.
CPU_B   =0   CPU B        TRIGGER DISABLED.
        =1   CPU B        TRIGGER ENABLED.
```

FIG. 2c

```
EDGE_T1  =0   TRIGGER ON RISING    EDGE OF TIMER 1 OUTPUT.
         =1   TRIGGER ON FALLING   EDGE OF TIMER 1 OUTPUT.
EDGE_T0  =0   TRIGGER ON RISING    EDGE OF TIMER 0 OUTPUT.
         =1   TRIGGER ON FALLING   EDGE OF TIMER 0 OUTPUT.
EDGE_E1  =0   TRIGGER ON RISING    EDGE OF EXT_1 INPUT.
         =1   TRIGGER ON FALLING   EDGE OF EXT_1 INPUT.
EDGE_E0  =0   TRIGGER ON RISING    EDGE OF EXT_0 INPUT.
         =1   TRIGGER ON FALLING   EDGE OF EXT_0 INPUT.
WAIT_E1  =0   EXECUTE EXT_1 SEQUENCE ON IDLE CONDITION.
         =1   EXECUTE EXT_1 SEQUENCE AT SELECTED WTMR_E1 OCCURRENCE.
WTMR_E1  =0   WAIT UNTIL TIMER_0.
         =1   WAIT UNTIL TIMER_1.
WAIT_E0  =0   EXECUTE EXT_0 SEQUENCE ON IDLE CONDITION.
         =1   EXECUTE EXT_0 SEQUENCE AT SELECTED WTMR_E0 OCCURRENCE.
WTMR_E0  =0   WAIT UNTIL TIMER_0.
         =1   WAIT UNTIL TIMER_1.
```

VECTOR - BASED SEQUENCER OPERATION

CONTROL REGISTER: TIMER_1 - DISABLED          EXT_TRIG1 - WAIT = 1, WTMR = 1

INTERRUPT VECTOR METHOD AND APPARATUS

This application is a division of application Ser. No. 08/100,152, filed Aug. 2, 1993, now U.S. Pat. No. 5,473,763.

BACKGROUND OF THE INVENTION

1. Field of the Invention

The present invention relates generally to a method and apparatus for responding to interrupts. More specifically, it relates to a vectoring scheme in which vectors previously loaded into interrupt registers can be immediately loaded into address counters upon activation of an interrupt and utilized efficiently by a plurality of processors.

2. Description of the Related Art

A number of interrupt schemes are well known in the art. Typical interrupt schemes involve fetching an address vector from a specified location in memory upon activation of interrupt. Interrupt schemes also typically push information onto a stack in memory to save key registers. This way program execution can be restarted at the same memory location at which the program was executing when the interrupt occurred.

In a typical sequence, a processor pushes all current registers onto the stack upon receipt of an interrupt, fetches the interrupt vector from a specified place in memory and executes the interrupt routine. Following execution of the interrupt routine, the information is pulled off the stack and normal execution is resumed.

However, in a system in which interrupts are routinely used to signal the start of a processing function, and in which the response time of the system is limited, the overhead involved in traditional interrupt schemes is excessive. This overhead manifests itself in the number of clock cycles required to go to memory, fetch the correct vector, and load it into the program counter. Accordingly, a more efficient interrupt approach is required to meet the needs of an interrupt driven system with limited time resources.

Additionally, in an environment requiring synchronization of both synchronous and asynchronous routines in a plurality of signal processors, more efficient use of processors is desirable where the processing is intensive and synchronous trigger rates are high. Typical approaches have involved some sort of load and lock to assure correct communication among sequential tasks in a plurality of processors.

SUMMARY OF THE INVENTION

It is therefore an object of this invention to provide an interrupt approach that minimizes the time to respond to activation of an interrupt. This is accomplished by beginning execution of the interrupt routine in a minimum number of clock cycles. It is a further object of this invention to provide an architecture and method which can advantageously utilize this interrupt vector scheme in a variety of applications requiring fast response to certain predetermined events.

It is a further object of the invention to provide an apparatus and a method to efficiently synchronize routines in a plurality of signal processors utilizing the vectoring approach of the invention in combination with a fifo-like mail box method of communication between the plurality of processors. This invention maximizes the utilization of signal processing resources by utilizing a cross triggering scheme so that one processor can utilize another processor's capabilities as needed.

The above and other objects are attained by the interrupt vector method and apparatus of the instant invention.

An apparatus is provided for processing a plurality of interrupts in a processor system, comprising a plurality of interrupt vector registers each having an interrupt trigger input, each of the interrupt vector registers containing a programmable interrupt vector. A multiplexer is connected to the interrupt vector registers and control logic controls the multiplexer to select one of the interrupt vectors as the selected interrupt vector upon activation of the corresponding interrupt trigger. A slot memory address counter receives the selected interrupt vector through the multiplexer, the slot memory address being controlled by the control logic to load the selected interrupt vector.

The interrupt vector approach of the instant invention loads an interrupt vector directly into an address register to minimize overhead associated with processing interrupts.

A plurality of interrupt triggers correspond to a plurality of interrupt vector registers, each containing a programmable interrupt vector. Upon activation of one of the interrupt triggers, the contents of the corresponding interrupt vector is loaded into a slot memory address counter. The slot memory address counter addresses a sequencer slot memory. The sequencer slot memory contains the starting addresses of sequences of instructions stored in an instruction memory. An instruction address counter receives addresses from the sequencer slot memory and provides addresses to the instruction memory. Upon activation of one of the interrupt triggers, execution of one of the sequences beginning at the address contained in the interrupt register corresponding to the active interrupt trigger is begun. Addresses of the sequences in the sequencer slot memory are sequentially loaded into the instruction address counter until a stop bit is indicated in a word in the sequencer slot memory. As a result an efficient response to an interrupt is provided in which overhead requirements for processing the interrupt are minimized.

Additional features and advantages of the invention will be made clear from the accompanying drawings and the following detailed description.

BRIEF DESCRIPTION OF THE DRAWINGS

FIG. (1) shows the system architecture in which the interrupt vector scheme is utilized.

FIG. (2) shows the overall architecture of an SSP.

FIGS. (2a, 2b, and 2c) show details of the sequencer control register.

FIG. (3) shows a sequencer operation with Timer_1 enabled and Ext_1 disabled.

FIG. (4) shows a sequencer operation with Timer_1 disabled and Ext_1 "no wait" enabled.

FIG. (5) shows a sequencer operation with Timer_1 disabled and Ext_1 "wait" enabled.

FIG. (6) shows a sequencer operation with Timer_1 enabled and Ext_1 "no wait" enabled.

FIG. (7) shows a sequencer operation with Timer_1 enabled and Ext_1 "wait" enabled.

FIG. (8) shows two signal processors utilizing a cross trigger to maximize efficient allocation of processor resources.

FIG. (9) illustrates the triggering mechanism between two SSPs.

DETAILED DESCRIPTION OF THE PREFERRED EMBODIMENTS

Figure 1:
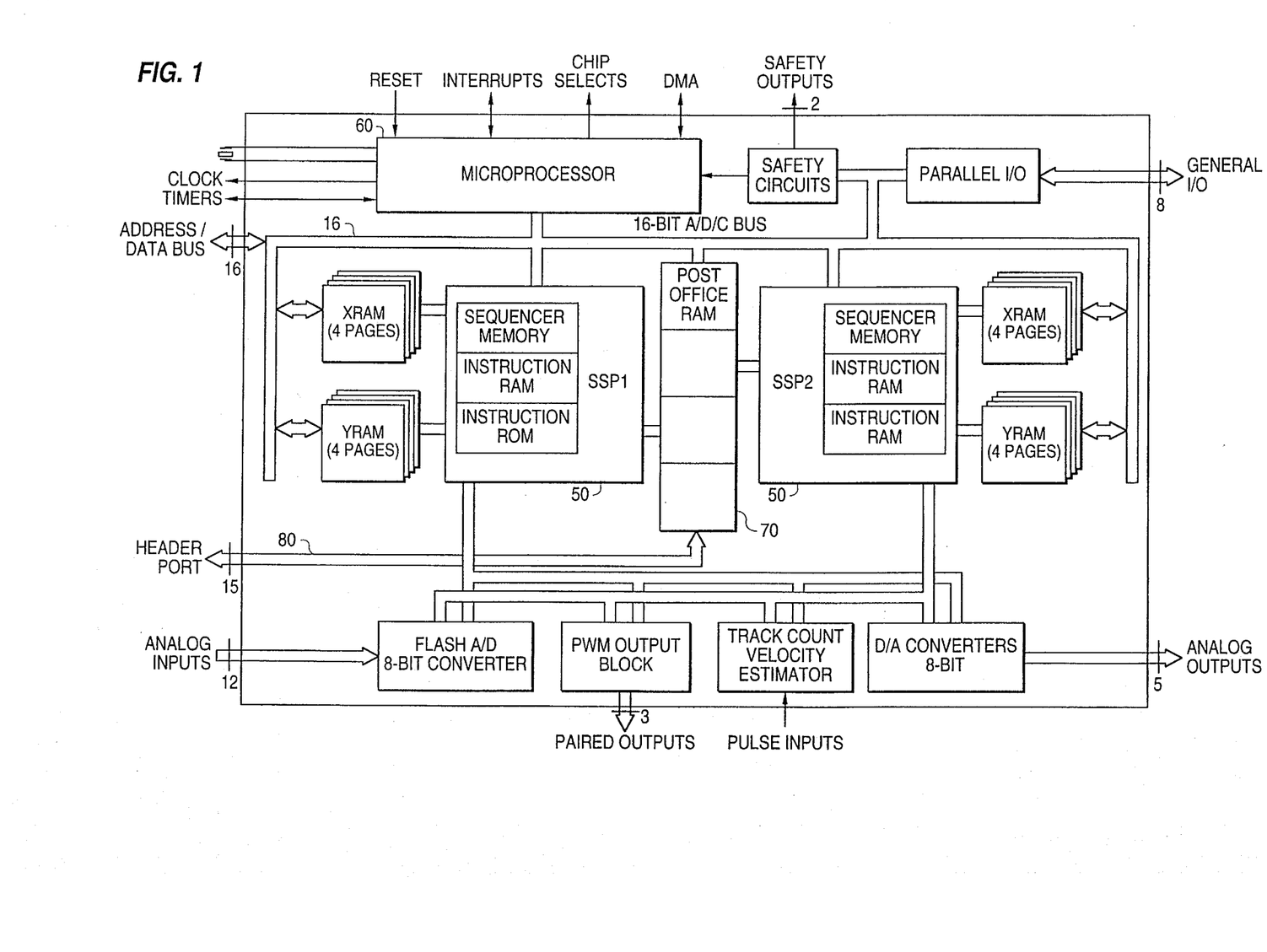

FIG. 1 shows one overall architecture in which an interrupt vectoring scheme according to the invention may be utilized. Streamlined Signal Processors (SSP1 and SSP2) 50 are connected to a microprocessor (address/data/control) bus 16. Microprocessor 60 accesses certain internal registers of the SSPs via bus 16. Additionally, each SSP 50 can access Post Office RAM 70. The Post Office RAM 70 is used to pass information among the four devices that have access. The Post Office RAM 70 is divided into four blocks of memory locations. Four devices, the two SSPs 50, microprocessor 60, and a Header Port over bus 80, have read access to all memory locations in the Post Office RAM 70. Each of the four devices has write access only to its memory block. In a preferred embodiment, each block consists of eight bytes. Other sizes are of course within the scope of the invention. The optimum size of the Post Office RAM will depend upon the environment in which it is implemented.

Figure 2:
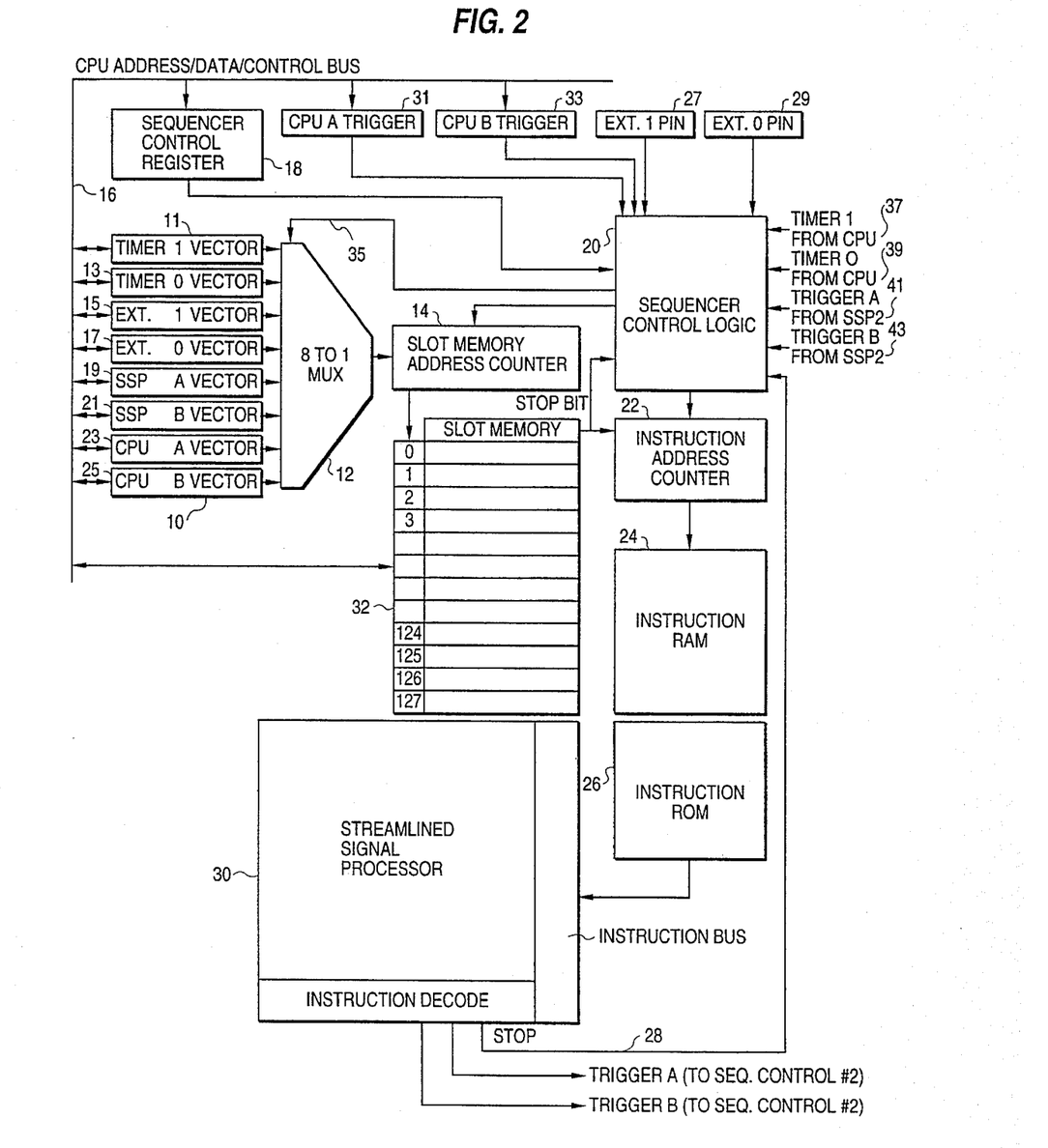

Referring now to FIG. 2, the microprocessor 60 can access vector registers 10 via bus 16. The microprocessor 60 can write the vector registers at any time, i.e. an SSP need not be in an Idle State. This allows the interrupt vector registers 10 to be loaded over the microprocessor bus 16 and be initialized and updated as needed.

The SSPs are driven by programs stored in an on-board memory. A sequence, commonly called a subroutine in programming practice, refers to a group of SSP instructions which perform a particular task. A sequence can either be stored in instruction RAM (IRAM) 24 or instruction ROM (IROM) 26. The start address of each sequence resides in the sequencer slot memory 32. A typical operation would be triggered by a synchronous event called a trigger event.

Each SSP contains eight vector registers 10. The vector registers 10 contain start addresses of sequences. The vector registers point to the first sequence in a series to be executed. Each trigger has its own vector which is programmed by the CPU through address/data/control bus 16. Vector registers 10 are activated either by an interrupt signal from an external I/O pin or by writing a memory mapped latch which corresponds to that particular interrupt vector. External pins 27 and 29 allow external devices to trigger interrupts (trigger events). Memory mapped latches 31 and 33 allow processors or other devices with write access to those registers to activate trigger events. The other triggers, Timer__1, Timer__0, trigger A and trigger B (37, 39, 41, 43) are provided to sequencer control logic 20.

The vector registers are shown in Table 1. Of course, the particular manner of triggering the event via either external pins or memory mapped latches will depend upon the context in which the invention is practiced.

TABLE 1

| | |
|---|---|
| 1) TMR__1 VECTOR: | points to the first sequence to be executed when a Timer__1 Frame Sync occurs (the TMR__1 bit in the Sequence Control |
| 2) TMR__0 VECTOR: | points to the first sequence to be executed when a TIMER__0 Frame Sync occurs (the TMR__0 bit in the Sequence Control Register must be enabled.) |
| 3) EXT__1 VECTOR: | points to the first sequence to be executed when a EXT__1 async trigger occurs (the EXT__1 bit in the Sequencer Control Register must be enabled.) |
| 4) EXT__0 VECTOR: | points to the first sequence to be executed when an EXT__0 async trigger occurs (the EXT__0 bit in the Sequence Control |

TABLE 1-continued

| | |
|---|---|
| | Register must be enabled.) |
| 5) SSP__A VECTOR: | points to the first sequence to be executed when an SSP__A hardware strobe is generated by the peer SSP (the SSP__A bit in the Sequence Control Register must be enabled.) |
| 6) SSP__B VECTOR: | points to the first sequence to be executed when an SSP__B bit hardware strobe is generated by the peer SSP (the SSP__B bit in the Sequence Control Register must be enabled) |
| 7) CPU__A VECTOR: | points to the first sequence to be executed when the CPU__A trigger register is written (the CPU__A bit in the Sequencer Control Register must be enabled.) |
| 8) CPU__B VECTOR: | points to the first sequence to be executed when the CPU__B trigger register is written (the CPU__B bit in the Sequencer Control Register must be enabled.) |

The eight interrupt vector registers 10 include two synchronous interrupt registers, Timer__0 vector register 11 and Timer__1 vector register 13. More than one trigger can occur at a time in this particular embodiment, but synchronous triggers (generated by the processor 60) can not be nested. Timer__1 is given priority over Timer__0. The two timer vector registers are provided to allow timers internal to the microprocessor to trigger synchronous events (called frame sync) on either SSP1 or both SSPs. Note that Timer__1 is not dedicated to SSP1, and Timer__0 is not dedicated to SSP2. In fact, an SSP is not required to have a timer-synchronous trigger at all. Should two or more trigger requests occur during the same cycle, the sequences will execute in the order shown in Table 2. Note that if a Timer__1 (TMR__1) and a Timer__0 (TMR__0) request occur in the same cycle, only the Timer__1 sequence will execute. All triggers except TMR__1 and TMR__0 are allowed to queue, waiting for another event to complete.

TABLE 2

| | | |
|---|---|---|
| TMR__1 | - highest priority | (does not queue) |
| TMR__0 | | (does not queue) |
| EXT__1 | | (allowed to queue) |
| EXT__0 | | (allowed to queue) |
| SSP__A | | (allowed to queue) |
| SSP__A | | (allowed to queue) |
| CPU-A | | (allowed to queue) |
| CPU__B | - lowest priority | (allowed to queue) |

EXT__1 vector register 15 and EXT__0 vector register 17 allow externally generated signals to trigger events on the SSPs. In a preferred embodiment, edge triggered external signals trigger asynchronous SSP events. The inputs drive set/reset latches which are cleared at the end of the triggered series, i.e. when the SSP enters the Idle State. The sequencer control register 18 determines which input effects which SSP and specifies whether each pin is positive or negative edge triggered.

Figure 2A:
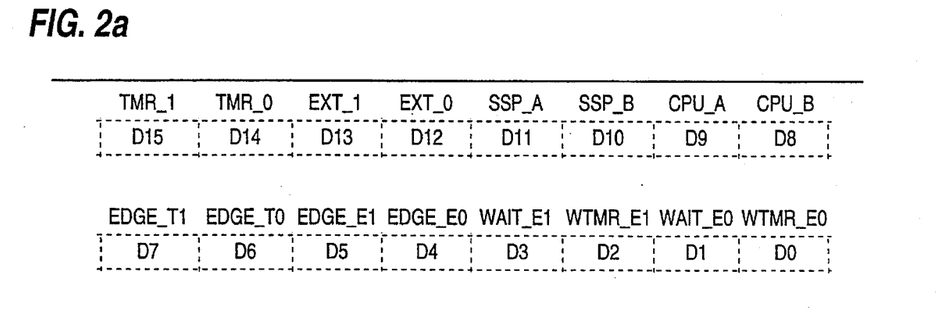
Figure 2B:
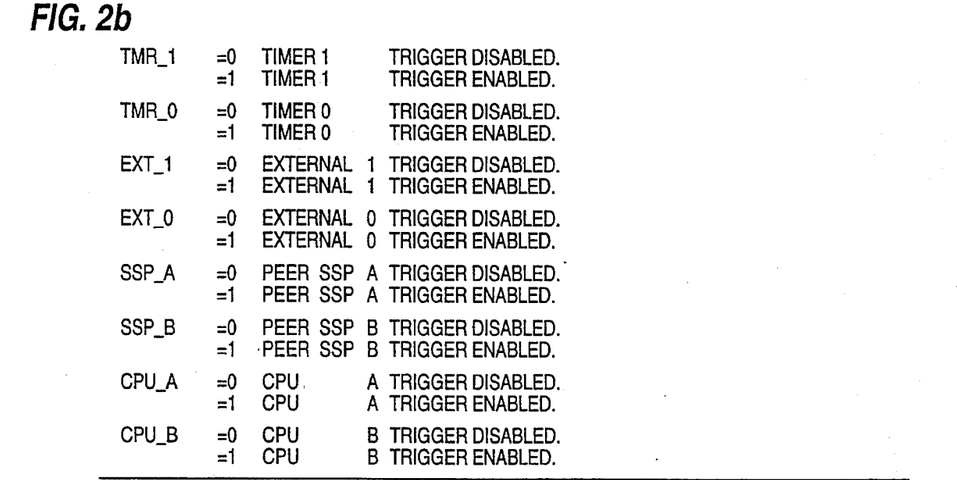
Figure 2C:
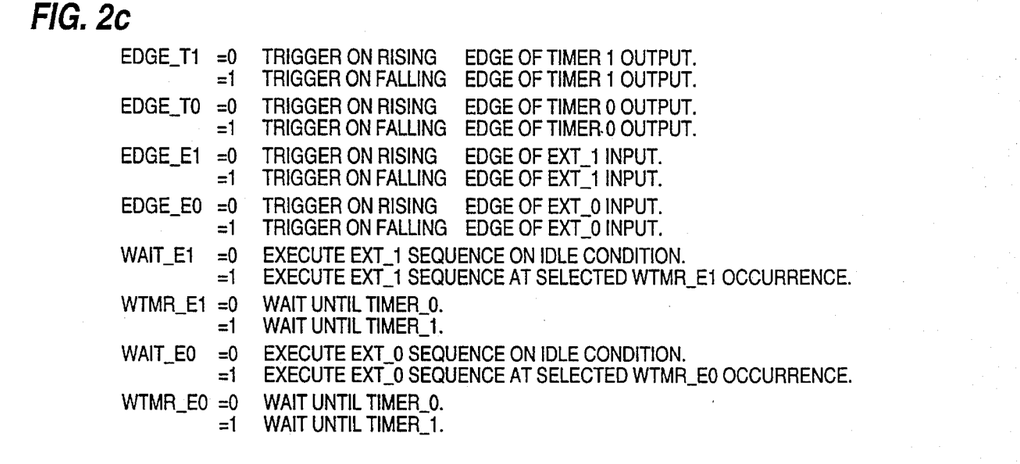

The sequencer operations are controlled through the settings of the Sequencer Control Register 18 shown in detail in FIG. 2a. The Sequencer Control Register bits are shown in FIGS. 2b and 2c. The Sequencer Control Register enables the trigger and determines the type of edge triggering utilized. For example, bit D7=1 (Edge__T1) sets the trigger to occur on the falling edge of the Timer__1 output. Additional control bits (WAIT__E1, WTMR__E1, WAIT__E0) are used to determine conditional executions for EXT__1 and EXT__0 as shown in FIG. 2C.

SSP_A and SSP_B vector registers 19 and 21 allow an SSP to trigger two asynchronous events on its peer SSP.

The 'C186 vector registers (CPU A and B) allow the processor to trigger two asynchronous events on an SSP.

Priorities may be assigned in terms of servicing 10 interrupts corresponding to the vector registers. For instance, the synchronous interrupts (vector registers 11 and 13) are assigned a higher priority than the asynchronous interrupt vector registers (15, 17, 19, 21, 23 and 25). Priorities among the synchronous interrupt vectors (indicated previously in Table 2) and the asynchronous interrupt vectors may also be assigned, as is well known in the art. In the preferred embodiment, the synchronous triggers cause the SSP to take action immediately, whereas the asynchronous triggers remain pending until the synchronous trigger has been serviced.

An address multiplexer 12, controlled by the sequencer control logic 20 and the sequencer control register 18, via control lines 35, selects which of the addresses contained in the vector registers 10 are loaded into the slot memory address counter 14 when a trigger event occurs.

The slot memory address counter 14 provides a pointer to the next sequencer slot to be transferred to the instruction address counter 22. The slot memory address counter 14 is loaded at the beginning of a trigger event with the contents of the appropriate vector register 10. The slot memory address counter 14 is incremented to the next slot (the next address in sequencer slot memory 32) after the current sequence completes, unless the current slot is programmed for stop mode or unless a stop signal 28 has been received from the SSP. In these cases the slot memory address counter is not incremented, and the SSP enters the idle mode.

The purpose of the vector registers 10 is to allow a synchronous or asynchronous trigger to cause an SSP 50 to perform a specific function. Triggers are analogous to processor interrupts, and the vector registers are analogous to the memory locations which contain the address of the interrupt service routines. The sequencer slot memory 32 is a user-programmable RAM that points to the start addresses of the sequences stored in IRAM 24 or IROM 26 to be executed by the streamlined signal processor 30. The IROM 26 and IRAM 24 contain microcode to be executed by the SSPs 50. The contents of the slot memory 32 must be downloaded by a device, e.g. the processor, prior to enabling the SSP for execution. The download can be from any device having access to the microprocessor bus 16.

The instruction address counter 22 points to the next instruction in IRAM or IROM to be executed by the signal processor 30. This counter is incremented every clock cycle and is loaded with the contents of the slot memory 32 pointed to by the slot memory address counter 14 when a trigger event occurs.

The architecture allows the user to employ the principle of "static scheduling." This principle is based on a priori knowledge of the application and the sequence in which it must be executed. The application is essentially mapped on to a space/time chart on a frame-by-frame basis (shown in FIGS. 3–7). Each frame consists of a set of subroutines or microcode modules executing at specific instances in the frame. Therefore, the three processors in the architecture of the preferred embodiment (SSP1, SSP2 and the microprocessor) can operate autonomously as long as interprocessor communication can take place at prescribed instances in the frame, for example, for data transfer or parameter passing between the Processors.

To support this scheduling exercise, the sequencer (including elements 18, 20 and 22), slot memory 32 and special function registers, e.g. registers to enable sequencing of the servo loops in a particular application can be programmed dynamically.

To accommodate systems requiring timely response to asynchronous input, it is also possible for the system to be only partially statically scheduled. The vector mechanism also accommodates such a mode of operation. In a system which can be both statically scheduled and experience asynchronous events, a typical source of conflict is the Analog I/O resources. In such a system, priority will typically be given to the SSP 50 into which a portion of the system has been statically scheduled, thereby preserving the synchronicity of SSP operation. The other SSP typically is programmed to respond via the vector register mechanisms to the asynchronous part of the system schedule. Since it is by definition asynchronous, typically the small jitter in its timing is allowable. A typical source of such jitter is that a vector occurs at an unpredictable time in the currently-executing frame. Therefore, the vectored operation must wait until the next sequencer idle time. Jitter also occurs because the SSP is contending for the analog I/O resources, and is required to wait for the higher-priority, statically-scheduled SSP 50 to relinquish it. In many cases, these sources of jitter can be eliminated by deriving each SSP's frame sync signal from a common source.

Examples of the functioning of this vector mechanism in various modes are discussed below.

In order to provide great flexibility in handling the asynchronous and synchronous interrupts, several operational approaches can be utilized. These are illustrated in FIGS. 3–7, which show a simplified vector scheme to facilitate understanding of the invention. While only two interrupts are shown in these examples, the approach explained by way of these examples is easily extendable by those skilled in the art to handle the eight interrupts described in the preferred embodiment or any other requisite number of interrupts.

Figure 3:
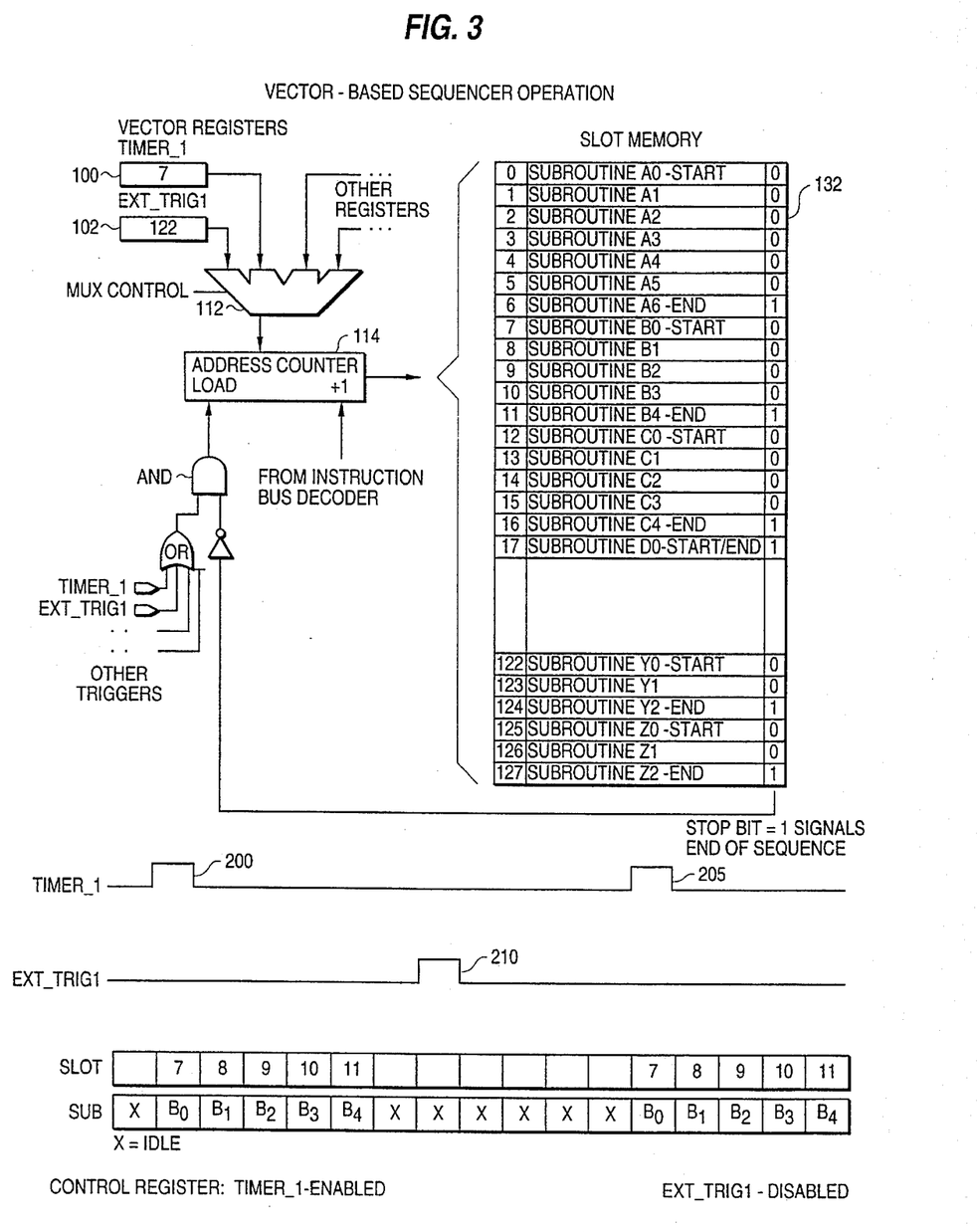

In FIG. 3, vector register 100 (Timer_1) contains the value 7 and corresponds to a synchronous trigger event. Vector register 102 (EXT_1) contains a vector corresponding to an asynchronous trigger event. Multiplexer 112 selects between the two vector registers with one of the vectors being loaded into the slot memory address counter 114 which addresses the location in slot memory 132 containing the IROM or IRAM address.

In FIG. 3, the Timer_1 trigger is enabled and the EXT_1 trigger is disabled by way of the sequencer control register 18, which is previously loaded via the processor bus. Accordingly, when the Timer_1 trigger 200 occurs, the value 7 is loaded into the address counter 114 through multiplexer 112. The slot memory address 7 pointing to subroutine B0, is loaded into the instruction address counter and subroutine B0 is executed. The address counter 114 is incremented and subroutines B1–B4 are sequentially executed until a stop bit is encountered 11 as indicated by a "1" in the right column of address in slot memory 132. When the EXT_1 trigger 210 is activated, no action occurs because the EXT_1 trigger is disabled in the sequencer control register. When the next Timer_1 trigger 205 occurs, the same subroutine sequence (B0–B4) is executed.

Figure 4:
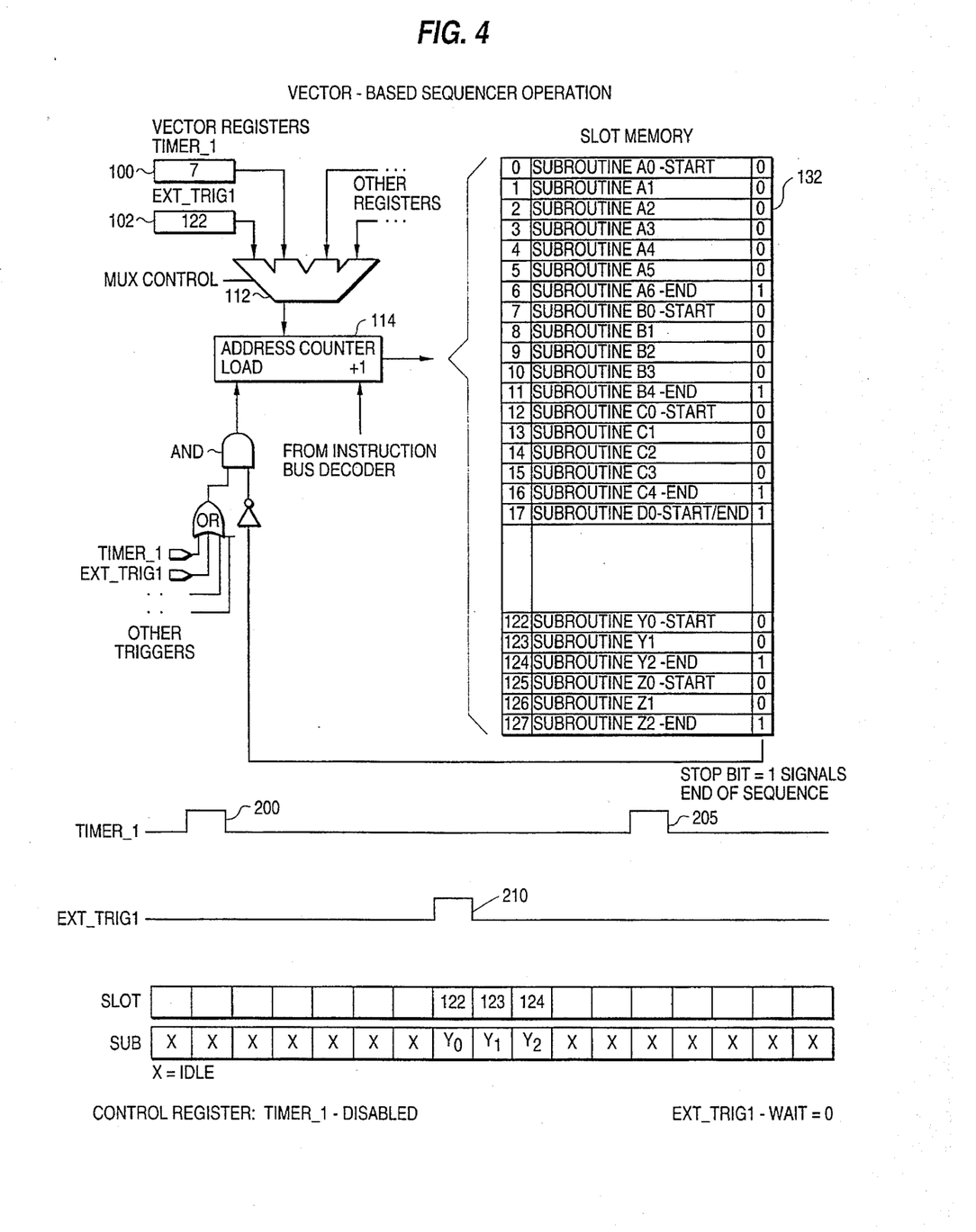

FIG. 4 illustrates operation of the invention with Timer_1 disabled and the EXT_1 "no-wait" mode enabled (WAIT_E1=0). With the Timer_1 disabled nothing happens when the trigger 200 occurs. When the "no-wait" mode is enabled and the EXT_1 trigger 210 occurs, the value 122, stored in vector register 102 is loaded into the address counter 114 via multiplexer 112. The slot memory address 122 containing subroutine Y0 is loaded into the instruction address counter and subroutine Y0 is executed. Address counter 114 is incremented and subroutines Y1–Y2 are sequentially executed until a stop bit is encountered in subroutine Y2, indicated by the "1" in the right column, putting the SSP in the idle mode. Timer_1 at 205 has no effect since it is disabled.

Figure 5:
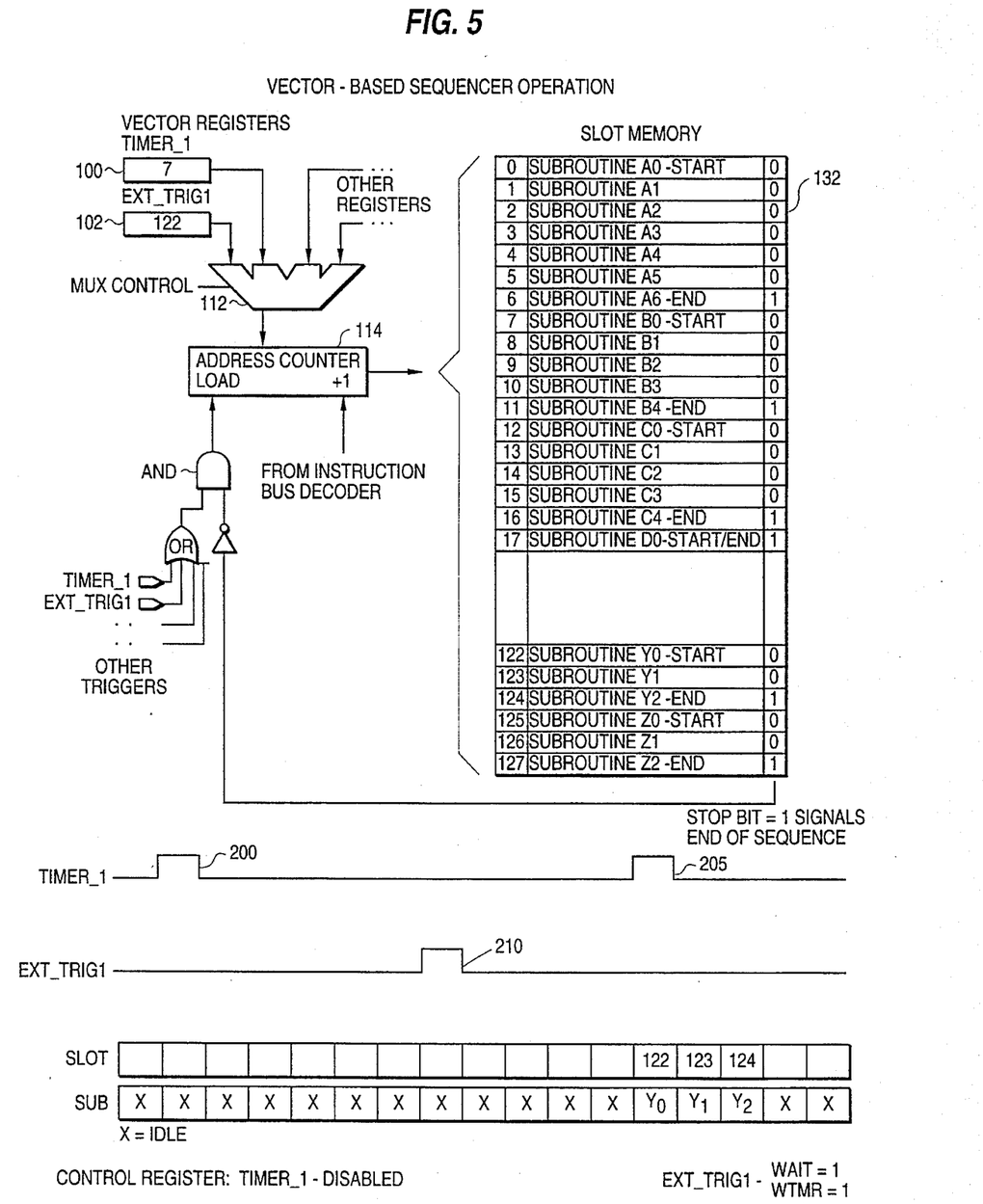

FIG. 5 illustrates operation of the invention with Timer_1 disabled and the EXT_1 "wait" mode enabled (WAIT_E1= 1; WTMR_E1=1). With Timer_1 disabled nothing happens when the synchronous trigger 200 occurs. When the "wait" mode is enabled and the EXT_1 trigger 210 occurs, the sequencer waits for the Timer_1 signal 205 to occur before loading the value 122, stored in vector register 102, into the address counter 114 through multiplexer 112. Thus the "wait" mode requires both the EXT_1 trigger and the subsequent synchronous trigger before executing the particular sequence.

The slot memory address 122 containing the address of subroutine Y0 is loaded into the instruction address counter 22 and subroutine Y0 is executed. Subroutines Y1–Y2 are sequentially executed until a stop bit is encountered in subroutine Y2, indicated by the "1" in the right column of slot memory 132, putting the SSP in the idle mode.

Figure 6:
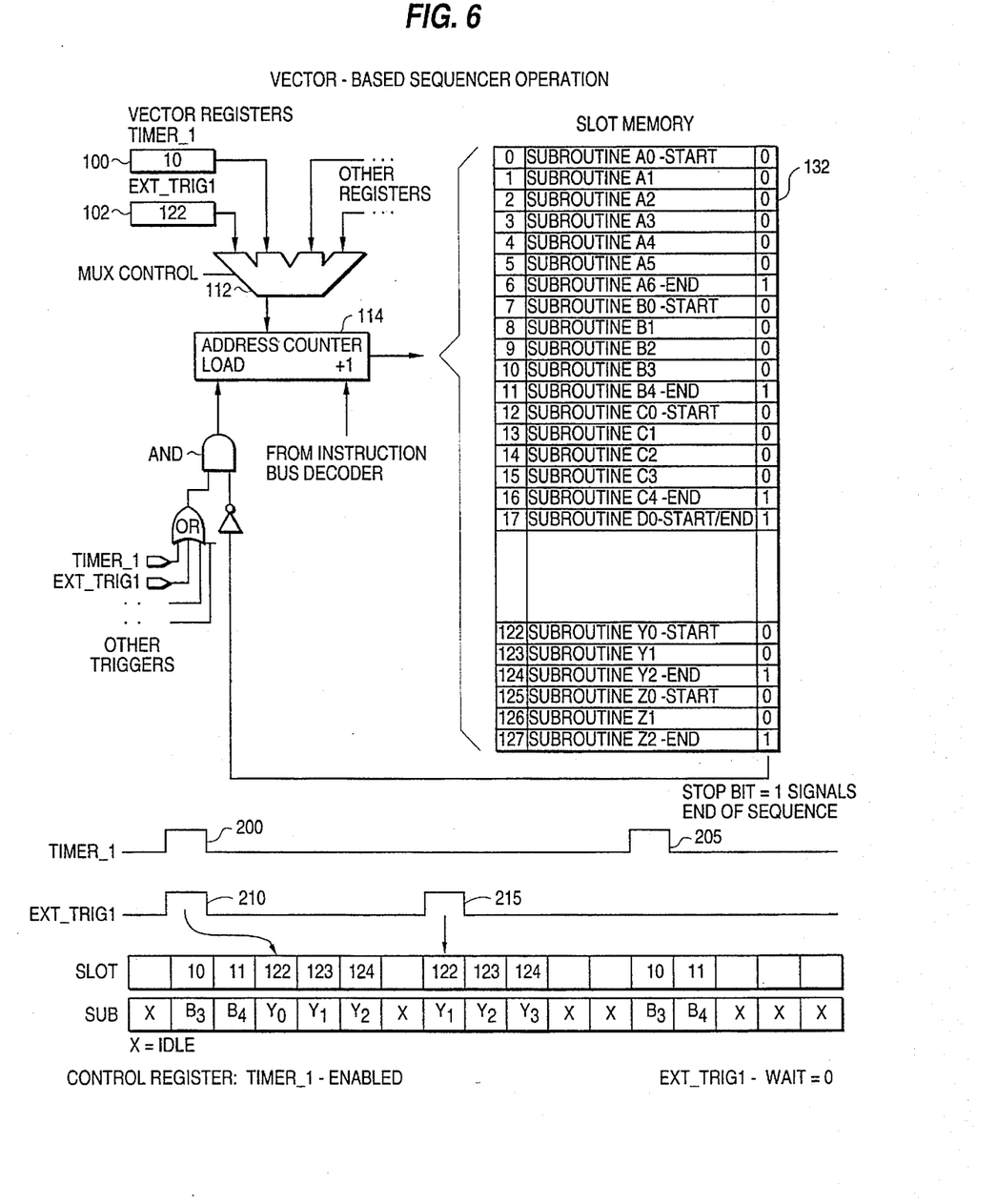

FIG. 6 illustrates the operation of the invention with Timer_1 enabled and the EXT_1 "no-wait" mode enabled. With the Timer_1 enabled, the value 10, contained in the vector register 100 is loaded into the address counter 114 through multiplexer 112 when the Timer_1 trigger 200 occurs. The SSP executes sequence B3 whose address is contained at address 10 in the slot memory. The slot memory address counter 114 is then incremented sequentially executing subroutine B4 (pointed to by slot memory address 11), until a stop bit is encountered, as indicated by the "1" in the right column of address 11 (B4) of slot memory 132.

When the EXT_1 trigger 210 occurs with the "no-wait" mode enabled, servicing of EXT_1 trigger 210 is delayed until the completion of servicing the Timer_1 trigger 200, which has a higher priority. Thus the value 122, stored in vector register 102 is loaded into the address counter 114 through multiplexer 112 immediately on completion of subroutine B4. The slot memory address 122 points to subroutine Y0 in IROM or IRAM and the subroutine is then executed. The address counter 114 is incremented and subroutines Y1–Y2 are sequentially executed until a stop bit is encountered in subroutine Y2, indicated by the "1" in the right column of slot memory 132, putting the SSP in the idle mode.

When the EXT_1 trigger 215 occurs, because the sequencer is not servicing another trigger event (the SSP is in the IDLE state) the value 122, stored in vector register 102, is again loaded into the address counter 14 through multiplexer 112. The slot memory address 122 points to subroutine Y0, which is then executed. The address counter 114 is incremented and subroutines Y1–Y2 are sequentially executed until a stop bit is encountered in subroutine Y2, indicated by the "1" in the right column, putting the SSP in the idle mode.

When the Timer_1 trigger 205 occurs, the value 10 is loaded into the address counter 114 through multiplexer 112. Subroutine B3 pointed to by slot memory address 10 is executed. The address counter 114 is incremented and subroutine B4 is executed until the stop bit is encountered.

Figure 7:
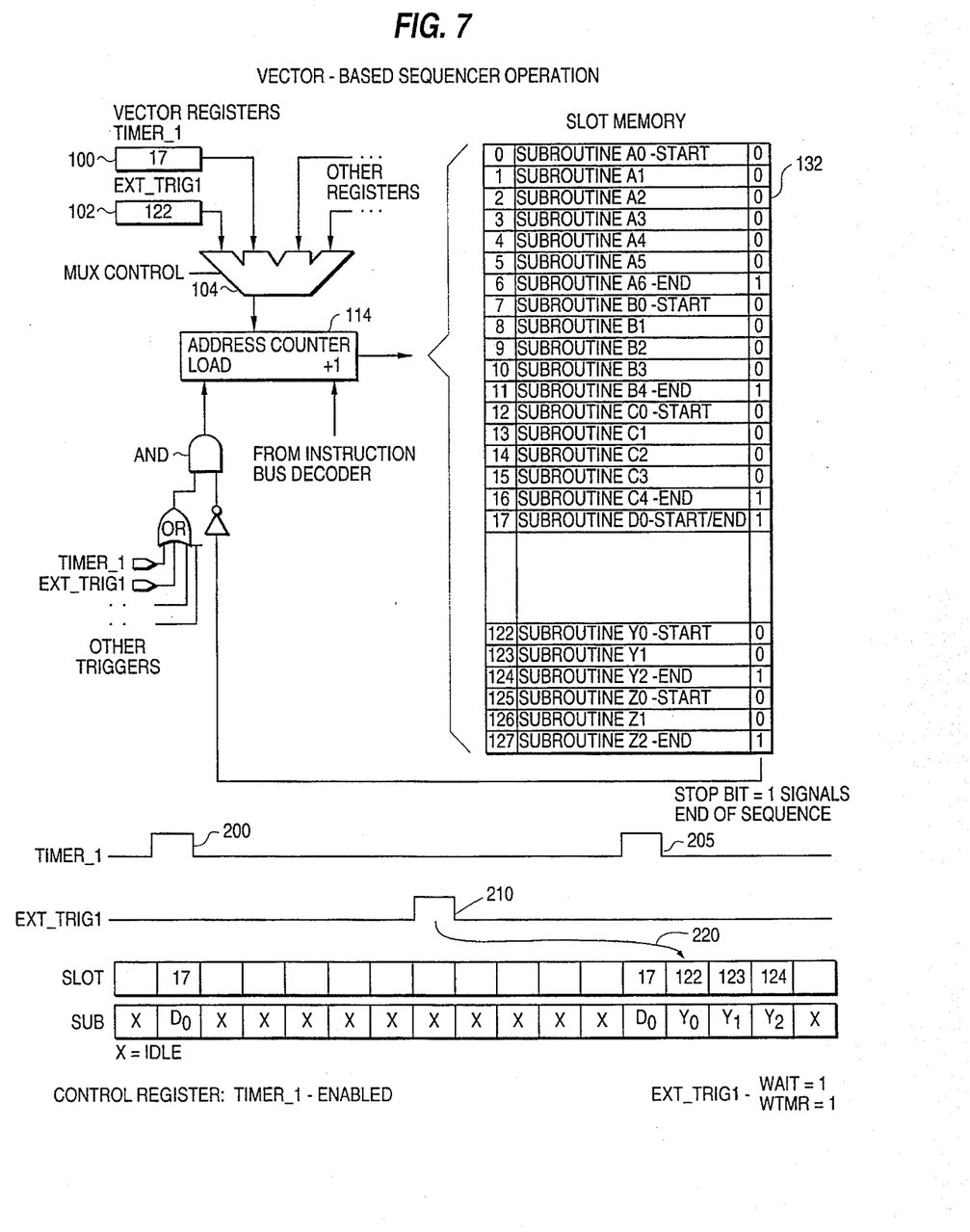

FIG. 7 illustrates that the lower priority interrupt is serviced immediately subsequent to the completion of the higher priority sequences when Timer_1 is enabled and the EXT_1 "wait" is enabled.

With the Timer_1 enabled, the value 17, which is contained in the vector register 100, is loaded into the address counter 114 through multiplexer 112 when the frame sync trigger 200 occurs. The slot memory address 17 pointing to sequence D0 is executed. The slot memory address counter 114 is not incremented since D0 contains a stop bit, as indicated by the "1" in the last column of address 17 (D0) of slot memory 132. On completion of sequence D0 the SSP enters the IDLE state.

When the EXT_1 trigger 210 occurs with the "wait" mode enabled, servicing of EXT_1 trigger 210 is delayed until the occurrence of a Timer_1 trigger 205. Since Timer_1 is enabled, completion of servicing the Timer_1 trigger is required prior to servicing the EXT_1 trigger as indicated by arrow 220.

Thus, the value 17, contained in the vector register 100, is loaded into the address counter 114 through multiplexer 112 when the Timer_1 trigger 205 occurs. The slot memory address 17 pointing to subroutine D0 is executed. The slot memory address counter 114 is not incremented since D0 contains a stop bit, as indicated by the "1" in the last column of address 17 (D0).

Immediately on completion of sequence D0, the value 122, stored in vector register 102, is loaded into the address counter 114 through multiplexer 112. The slot memory address 122 pointing to subroutine Y0 in IROM or IRAM is executed. The address counter 114 is incremented and subroutines Y1–Y2 are sequentially executed until a stop bit is encountered in subroutine Y2, indicated by the "1" in the right column of slot memory 132, putting the SSP in the idle mode.

As can be seen in all of the above examples, the address counter is loaded with slot memory address values immediately upon a trigger event or completion of servicing a higher priority trigger event. This approach maximizes the efficiency of the sequencer and minimizes the overhead response time to trigger events.

Although in the preferred embodiment of the invention address counter 114 indirectly addresses the IROM and IRAM through the slot memory 132, it is also possible to directly address instruction memory through the address counter 114 in other embodiments of this invention.

Figure 8:
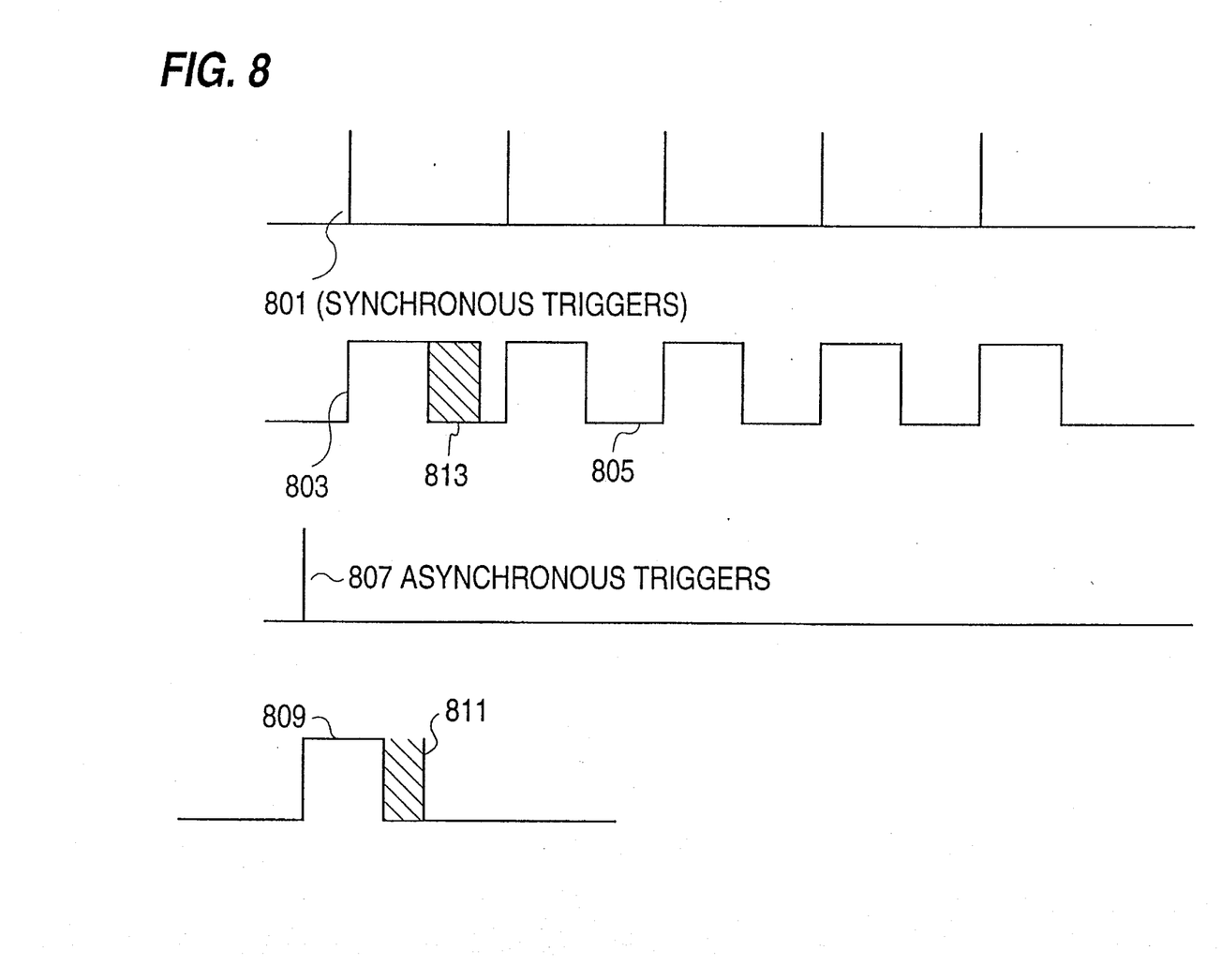

One utilization of the vectoring approach of the invention described above is in an environment having a plurality of signal processors performing either of both asynchronous and synchronous tasks. Assume two SSPs are performing asynchronous and synchronous tasks. For instance, referring to FIG. 8, in the process stabilizing a disk head over a particular track, synchronous frame sync triggers 801 may be associated with this sort of computation. In response to the frame synch triggers 801, a processor, e.g. SSP1, responds by performing the predetermined synchronous tasks at 803 (BUSY state) and then returns to the IDLE state at 805 upon completion of the tasks. Now assume another processor, e.g. SSP2 is performing an asynchronous task, e.g. seeking a disk head from track A to track B. Upon the beginning of the seek operation, denoted by asynchronous trigger 807 indicating a start seek, processor SSP2 would perform set up calculations 809 relating e.g. to the velocity profile of the mass of the moving head. When these setup calculations are completed, and the SSP2 writes the object of its calculation into a communications structure such a FIFO or a mailbox previously described, and a cross trigger is activated so that SSP2 interrupts SSP1 as described previously, e.g., through SSP_A-Vector register. Then calculations associated with the asynchronous vector triggered by the cross trigger following 811 can be performed during 813 at what had previously been an IDLE period. In this way, the signal processors can allocate processing resources among themselves in a manner suitable to the task and resources available. Thus, using uni-directional mailbox type of communication between processors, and the vectoring scheme, signal processing tasks can be allocated more efficiently among a plurality of signal processors performing either synchronous and asynchronous tasks. So, when one processor can not schedule all the calculations necessary for a particular task, other processing resources can be utilized.

Figure 9:
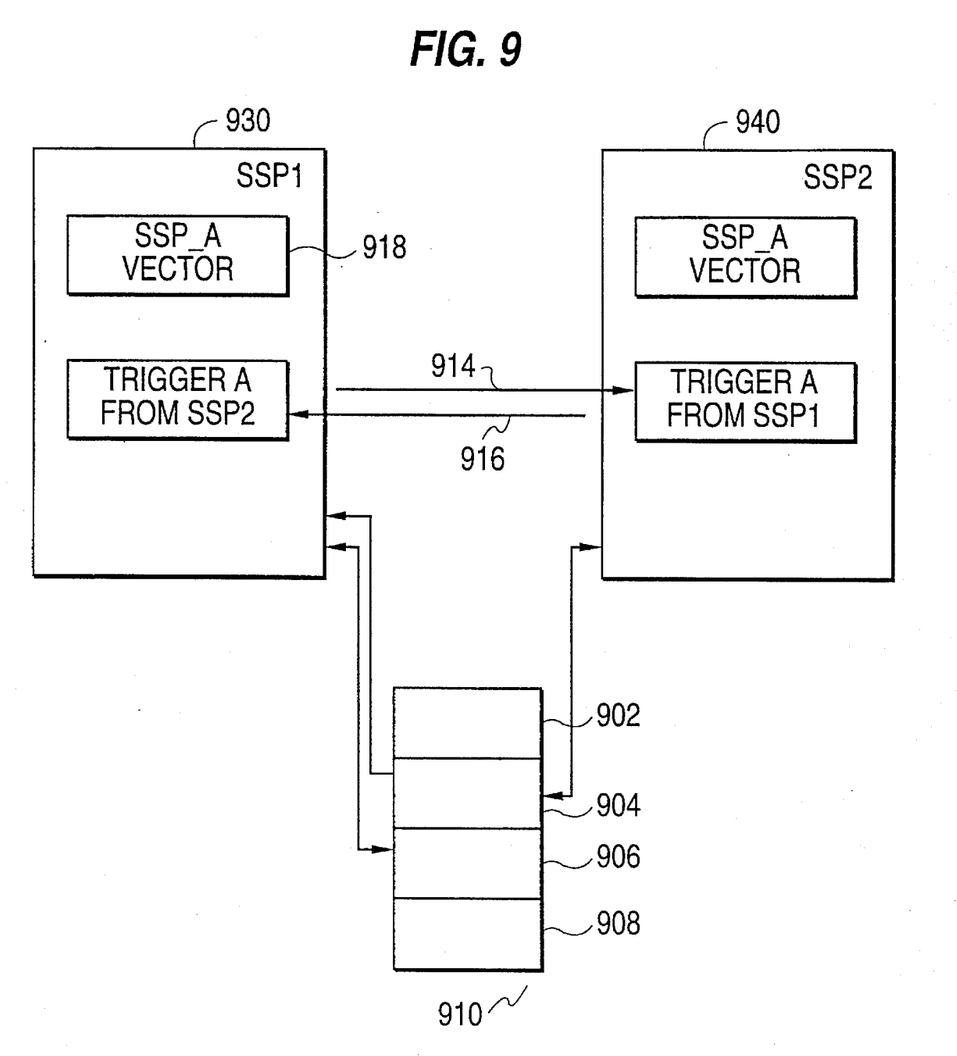

This triggering approach is illustrated in FIG. 9. Assuming that SSP1 930 is receiving the synchronous triggers 801. The triggers may come from, e.g., the Timer__1 trigger from the CPU (not illustrated in FIG. 9). The asynchronous trigger 807 for SSP2 940 may come from, e.g. the EXT__1 trigger (not illustrated in FIG. 9). Each SSP has the ability to trigger the other SSP through e.g., the SSP A trigger 914 and 916. Assume that upon completing the processing 811, SSP2 writes the results into its mailbox 904 of postoffice 910. SSP2 then triggers SSP1 via e.g. trigger 916. SSP1 930 responds to the trigger by loading the SSP__A Vector 918 into the slot memory address counter (not shown in FIG. 9) and executes a routine indicated at time 813 to read out the values contained in mailbox 904 of post office 910. SSP1 then executes the appropriate processing associated with the results contained in the mailbox until a stop bit is encountered in the right hand column of the slot memory address counter. SSP1 may also signal SSP2 at the end of the processing 813 via one of the SSP A trigger 914. Other triggering approaches may be used as is appropriate to the task being performed by the processors. Such other synchronizations can be established between the synchronous and asynchronous tasks of the processors as is apparent from the robust vectoring interrupt scheme described previously.

While the description of the embodiments of the present invention is directed to the area of signal processors, it should be understood that the present invention is also applicable to any processor system requiring an efficient response to interrupt conditions.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. An apparatus for co-tasking among a plurality of processors, comprising:

a first processor having means for responding to a first trigger and for executing a first set of routines related to a first task in response to said first trigger;

a mailbox accessible by each of said processors providing unidirectional communication between each of said processors;

a second processor having means for responding to a second trigger and for executing a second set of routines related to a second task in response to said second trigger, said second processor having means to trigger said first processor upon placing results from said second set of routines in said mailbox;

said first processor having means for reading said results from said mailbox and executing a third set of routines related to said second task using said results after completing said first set of routines related to said first task.

2. An apparatus as recited in claim 1 wherein said first trigger is synchronous and said second trigger is asynchronous.

3. A method for co-tasking among a plurality of processors, including a first and second processor, comprising the steps of:

said first processor responding to a first trigger and executing a first set of routines related to a first task in response to said first trigger;

said second processor responding to a second trigger and executing a second set of routines related to a second task, in response to said second trigger;

said second processor placing the results of execution of said second set of routines in a mailbox providing uni-direction communication between said processors;

said second processor triggering said first processor after placing said result in said mailbox; and said first processor executing a third set of routines related to said second task in response to triggering by said second processor, after completing a first set of routines, thereby providing assistance to said second processor in executing said second task.

\* \* \* \* \*